United States Patent
Maeda

(10) Patent No.: US 6,197,128 B1
(45) Date of Patent: Mar. 6, 2001

(54) ROLLING BEARING

(75) Inventor: Kikuo Maeda, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/157,621

(22) Filed: Sep. 21, 1998

(30) Foreign Application Priority Data

Sep. 25, 1997 (JP) .................................................. 9-260089

(51) Int. Cl.⁷ .................................................. C23C 8/22
(52) U.S. Cl. .......................... 148/319; 148/906; 384/492; 384/625; 384/912
(58) Field of Search .................................... 148/319, 906; 384/492, 625, 912

(56) References Cited

U.S. PATENT DOCUMENTS

| | | | |
|---|---|---|---|
| 4,871,268 | * 10/1989 | Furamura et al. | 384/492 |
| 5,352,303 | * 10/1994 | Murakami et al. | 148/318 |
| 5,413,643 | * 5/1995 | Murakami et al. | 148/319 |
| 5,560,787 | * 10/1996 | Takagi et al. | 148/319 |
| 5,989,694 | * 11/1999 | Mitamura et al. | 148/319 |

FOREIGN PATENT DOCUMENTS 8-303470   11/1996   (JP).

* cited by examiner

*Primary Examiner*—John Sheehan
(74) *Attorney, Agent, or Firm*—McDermott, Will & Emery

(57) ABSTRACT

A rolling bearing including a rolling bearing ring and a rolling element, at least one of the rolling bearing ring and the rolling element consisting of carburized steel containing at least 0.3% and at most 0.6% of C, at least 0.1% and at most 0.35% of Si, at least 1.1% and at most 1.5% of Mn, at least 0.5% and at most 2.0% of Cr, at least 0.2% and at most 0.6% of Ni and at least 0.15% and at most 0.5% of Mo by weight. Thus, an inexpensive and long life carburized steel rolling bearing can be obtained using a combination of chemical components of a relatively low cost.

2 Claims, 4 Drawing Sheets

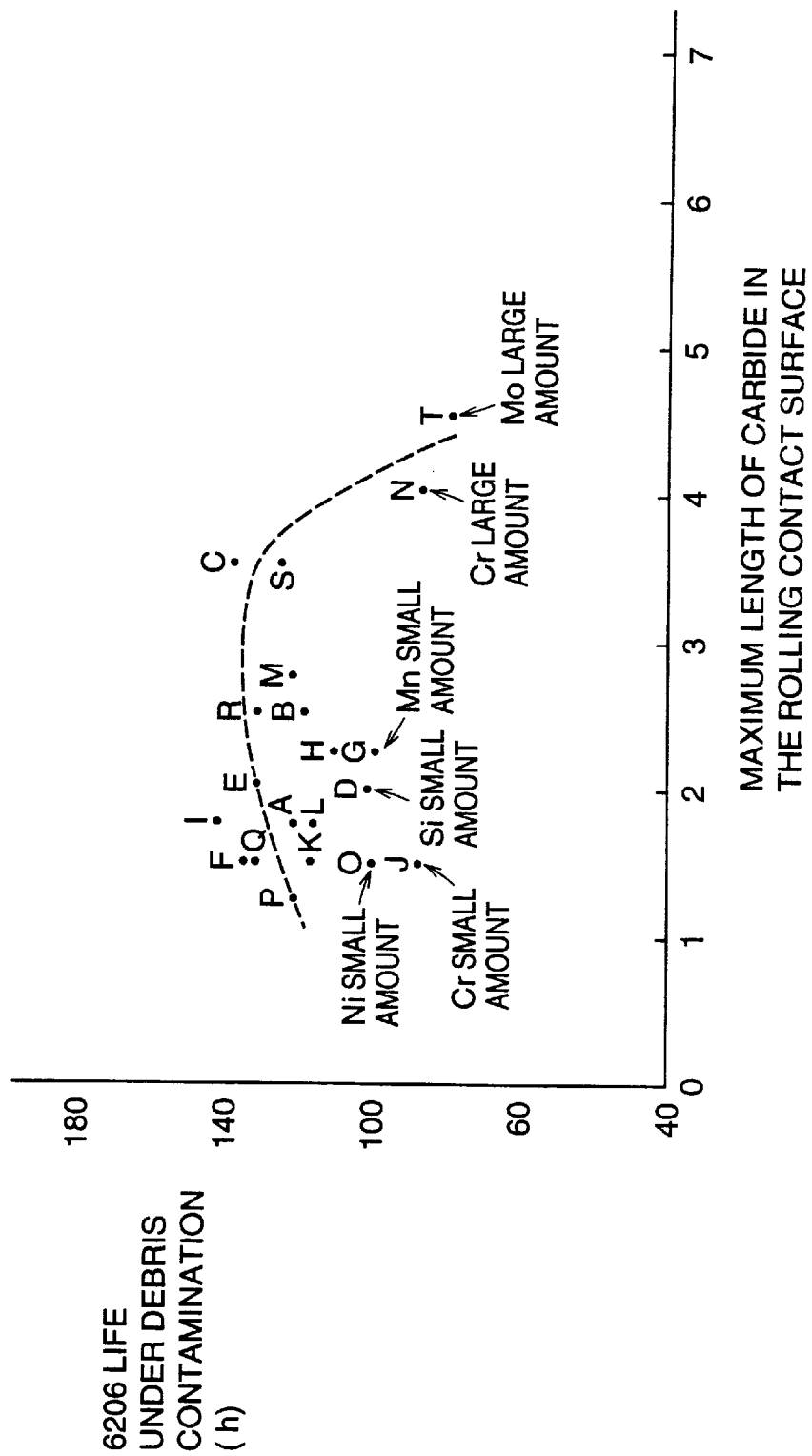

ROLLING BEARING

BACKGROUND OF THE INVENTION

1. Field of the Invention

The present invention relates to a rolling bearing and particularly to a rolling bearing consisting of carburized steel.

2. Description of the Background Art

Carburized steel commonly used as a bearing material has a longer rolling contact fatigue life than bearing steel. Thus a rolling bearing made of carburized steel is generally used as a long life bearing.

A long life of a carburized steel bearing is assumed to be attributable to a large amount of retained austenite produced by carburizing and the presence of compressive residual stress in its surface layer. It is assumed that a conventional steel product has a large amount of non-metallic inclusion, which acts as a source of stress concentration, whereas in the carburized steel rolling bearing, compressive residual stress and retained austenite produced by carburizing of the surface layer serve to relax the stress concentration.

Recent development in steelmaking technique, however, has resulted in the improvement in steel quality and has enhanced the life of bearing steel. Thus the advantage of carburized steel over bearing steel in terms of service life has almost eliminated.

Although it has been known that carburized steel(e.g. M50NiL steel) containing a large amount of Cr(chromium), Mo(molybdenum) and/or V(vanadium), exhibits a life even longer, the use of these expensive chemical components, such as Cr, Mo, and V is not practical.

SUMMARY OF THE INVENTION

An object of the present invention is to provide an inexpensive long life rolling bearing made of carbulized steel by the combination of relatively inexpensive chemical components.

Through a careful investigation, the inventor of the present application has found that inexpensive carburized steel with a long rolling contact life allowing rapid carburizing can be obtained by adding a prescribed amount of chemical components including C(carbon), Si(silicon), Mn(manganese), Cr(chromium), Ni(nickel) and Mo(molybdenum).

Therefore the present invention provides a rolling bearing having a rolling bearing ring and a rolling element constituting a rolling contact surface, at least one of the rolling bearing ring and the rolling element consisting of carburized steel containing at least 0.3 wt. % and at most 0.6 wt. % of C, at least 0.1 wt. % and at most 0.35 wt. % of Si, at least 1.1 wt % and at most 1.5 wt. % of Mn, at least 0.5 wt % and at most 2.0 wt. % of Cr, at least 0.2 wt % and at most 0.6 wt. % of Ni and at least 0.15 wt % and at most 0.5 wt. % of Mo.

The amounts of added chemical components are determined according to the following reasons.

C is an important element determining a basic toughness and hardness of carburized steel of the present invention. Through quenching, C undergoes the Martensitic transformation, whereby hardness is improved. C is also an austenite stabilizing element which prevents the degradation of toughness when being heated up to the austenitizing temperature. On the other hand, when the content of C is too high, resulting excessive hardness causes toughness to decrease. In the present invention, the lower limit of the C content is 0.3 wt. % because the carbide production, the quenching hardness of a core and the carburizing speed are enhanced by a higher C content. The upper limit is 0.6 wt. % to ensure toughness necessary for a rolling bearing.

The influence of the amount of initially added C on the rolling contact life is not evident, as C content in the surface layer produced by carburizing has a greater influence.

Si is known as a deoxidating element or an element which enhances hardness and heat resistance. As a high Si content suppresses carburizing, the upper limit of Si content is 0.35 wt. %. Because a higher Si content is preferred with regard to the rolling contact life, the lower limit is 0.1 wt. %.

When the Mn content is low, both the rolling contact life characteristic and the carburizing speed are impaired. On the other hand, a high Mn content degrades workability. Thus the Mn content is set in the range of 1.1–1.5 wt. %.

Though a high Cr content is favorable with regard to both the carbide production and the heat resistance, a higher Cr content means a higher cost as it is an expensive chemical component. When the Cr content is low, effect on the carbide production and heat resistance is decreased and the rolling contact life is shortened in the clean oil lubricating condition under high contact pressure and the debris contamination lubrication condition. When the Cr content is too high, cost rises and the rolling contact life under the debris contamination lubrication condition is shortened by formation of large carbide. Thus the range of Cr content is 0.5–2.0 wt. %.

Ni is necessary to some extent in order to enhance the toughness, but when the content is too high, increased retained austenite degrades the hardness. The Ni content must be at least 0.2 wt. % in order to prevent decrease in rolling contact life under the condition of the point contact (high contact stress) or the debris contamination and to avoid the lowering of toughness enhancement effect. The Ni content must be at most 0.6 wt. % in order to avoid the hardness degradation.

Mo is a life extending element which produces sub-carbide at the coexistence with Cr and enhances the tempering resistance. When the Mo content is too low, the rolling contact life under the point contact (high contact stress) condition decreases. When the Mo content is too high, the rolling contact life under the debris contamination condition decreases and cost becomes prohibitive. Therefore the range of Mo content is 0.15–0.5 wt. %.

In carburized steel, carburizing speed can be enhanced by decreasing the Si content and increasing the C content. In addition, by increasing the Mn content and the Cr content and decreasing the Ni content and the Mo content, a certain amount of retained austenite necessary for the enhancement of the rolling contact life can be secured and the austenite stabilization and high hardness due to the carbide precipitation can be attained with relatively inexpensive materials.

In the application where the use under high temperature is expected, a bearing having a surface layer with a long rolling contact life and an core with superior dimensional stability can be provided by carbo-nitriding and following high temperature tempering of the material of the present invention.

In the above-mentioned aspect, carburized steel preferably has a distribution of carbide having a maximum size of not more than 3.5 μm directly below the rolling contact surface and not more than 8 μm below a mill scale surface. Thus the stress concentration can be relaxed without sacrificing the anti-crack strength. Such carbide distribution can be achieved by carbo-nitriding the above described carburized steel.

In the aspect described above, preferably the compressive stress of the surface layer of carburized steel is at most −150 MPa to obtain a long life bearing. The feature of this carburized steel can be obtained by high temperature tempering.

In the aspect described above, carburized steel has 20–30% retained austenite in the surface layer and at most 5% retained austenite in the core. Thus a rolling bearing exhibiting a favorable dimensional stability and a long rolling contact life even under a high temperature can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a graph showing the relation between the maximum length (maximum grain size) of carbide in the rolling contact surface layer and the rolling contact life under the condition of debris contamination.

DESCRIPTION OF THE PREFERRED EMBODIMENTS

FIRST EXAMPLE

First, various steel samples (A–V) with different chemical compositions were prepared as shown in Table 1 below.

After carburizing (Cp=1.2%) these samples for 420 minutes at 950° C., and then carbo-nitriding for 60 minutes at 850° C., we compared the rolling contact lives of these samples with that of currently used steel (SCr420). The rolling contact life was evaluated using a ϕ12 point contact test sample under high stress and purified oil lubricating condition for a normal carburized product, and using a ball bearing 6206 with debris contamination for carbo-nitrided product. The test conditions are as shown in Tables 2 and 3.

TABLE 1

Chemical Components of Carburized Steel

| Steel type | C (wt %) | Si (wt %) | Mn (wt %) | Cr (wt %) | Ni (wt %) | Mo (wt %) | |
|---|---|---|---|---|---|---|---|
| A | 0.31 | 0.25 | 1.20 | 1.50 | 0.22 | 0.15 | Effect of C |
| B | 0.45 | 0.27 | 1.21 | 1.61 | 0.19 | 0.12 | |
| C | 0.6  | 0.23 | 1.18 | 1.52 | 0.18 | 0.14 | |
| D | 0.32 | 0.11 | 1.15 | 1.50 | 0.20 | 0.12 | Effect of Si |
| E | 0.34 | 0.35 | 1.18 | 1.50 | 0.22 | 0.13 | |
| F | 0.33 | 0.56 | 1.21 | 1.52 | 0.20 | 0.13 | |
| G | 0.32 | 0.23 | 0.8  | 1.51 | 0.18 | 0.12 | Effect of Mn |
| H | 0.34 | 0.25 | 1.01 | 1.51 | 0.21 | 0.12 | |
| I | 0.32 | 0.25 | 1.55 | 1.51 | 0.24 | 0.12 | |
| J | 0.32 | 0.26 | 1.23 | 0.32 | 0.22 | 0.15 | Effect of Cr |
| K | 0.31 | 0.25 | 1.15 | 0.51 | 0.23 | 0.15 | |
| L | 0.30 | 0.27 | 1.18 | 1.02 | 0.19 | 0.12 | |
| M | 0.30 | 0.27 | 1.17 | 2.12 | 0.21 | 0.14 | |
| N | 0.31 | 0.23 | 1.20 | 2.52 | 0.23 | 0.14 | |
| O | 0.31 | 0.25 | 1.09 | 1.51 | 0.12 | 0.15 | Effect of Ni |
| P | 0.31 | 0.23 | 1.12 | 1.52 | 0.43 | 0.14 | |
| Q | 0.32 | 0.24 | 0.15 | 1.53 | 0.65 | 0.16 | |
| R | 0.32 | 0.21 | 1.11 | 1.52 | 0.23 | 0.35 | Effect of Mo |
| S | 0.34 | 0.25 | 1.13 | 1.60 | 0.25 | 0.51 | |
| T | 0.32 | 0.26 | 1.15 | 1.52 | 0.23 | 0.98 | |
| U | 0.35 | 0.35 | 1.50 | 1.54 | 0.20 | 0.22 | Optimal combination |
| V | 0.20 | 0.24 | 0.78 | 1.10 | | | SCr420 |

TABLE 2

Test Condition for ϕ12 Life Under Point Contact (High Contact Stress)

| | |
|---|---|
| Test sample | ϕ12 × L22 |
| Mating steel ball | ¾" |
| Contact stress | Pmax = 5.88 GPa |
| Loading speed | 46240 cpm |
| Lubrication | supply of sprayed turbine oil VG68 |
| Test temperature | approximately 90° C. |

TABLE 3

Test Condition for 6206 with Debris Contamination

| | | |
|---|---|---|
| Test bearing | bail bearing 6206 | |
| Load | Fr = 6.86 mkN | |
| Rotating speed | 2000 rpm | |
| Lubrication | oil bath of turbine oil VG56 | |
| Oil volume | approximately 50 ml | |
| Debris | grain size | 104–177 μm |
| | hardness | Hv800 |
| | weight | 0.4 g/l |

Figure 1:
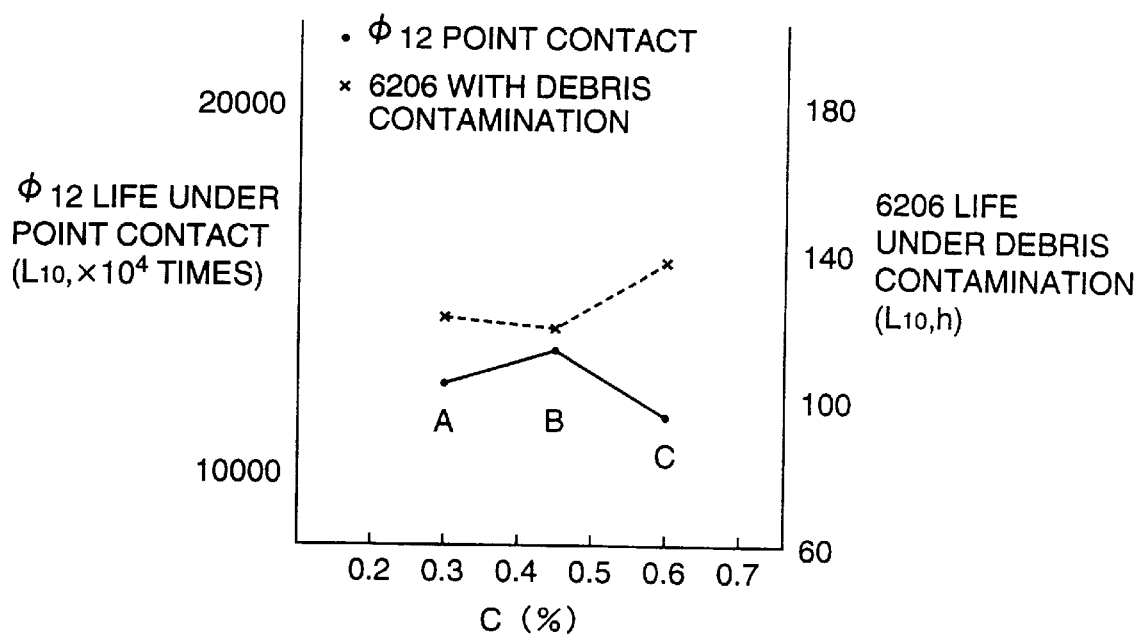
FIG. 1 is a graph showing the relation between the C content and the rolling contact life.
Figure 2:
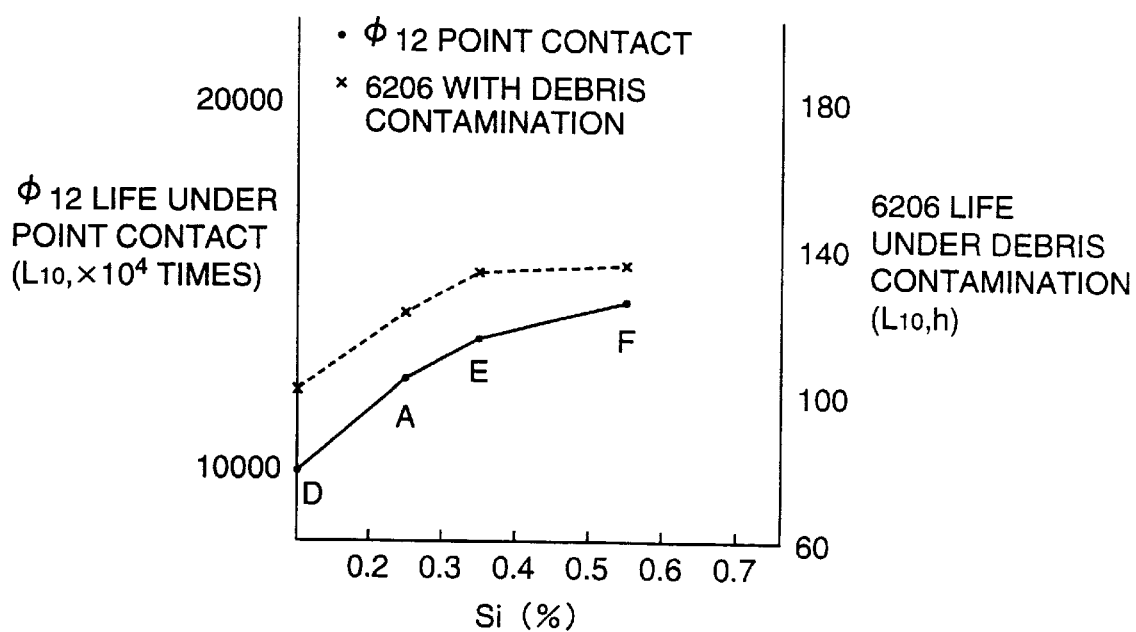
FIG. 2 is a graph showing the relation between the Si content and the rolling contact life.
Figure 3:
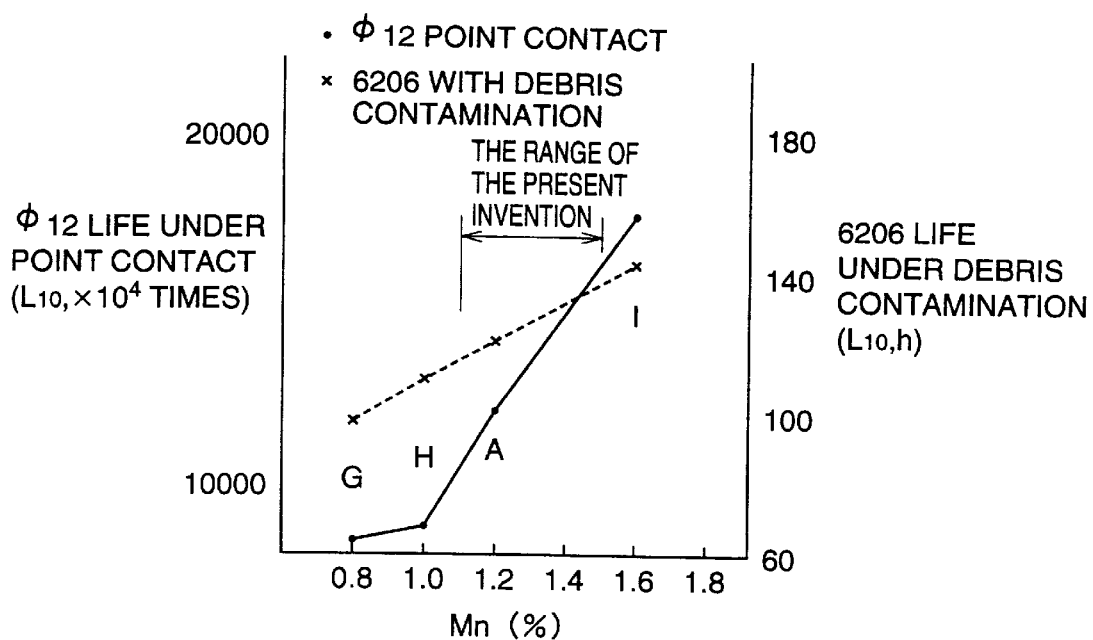
FIG. 3 is a graph showing the relation between the Mn content and the rolling contact life.
Figure 4:
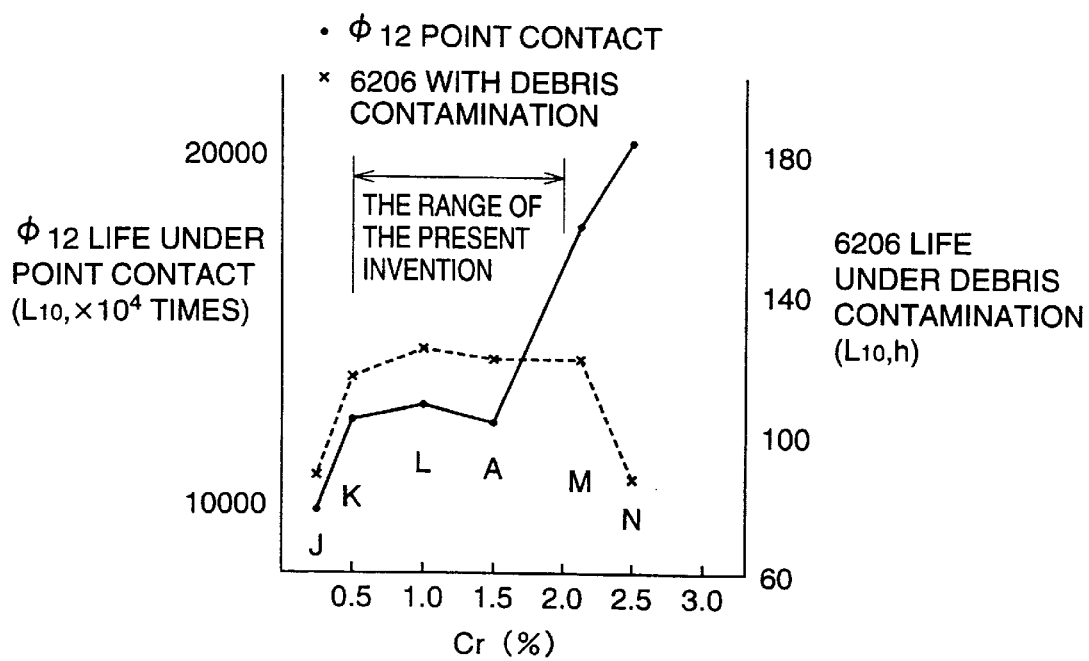
FIG. 4 is a graph showing the relation between the Cr content and the rolling contact life.
Figure 5:
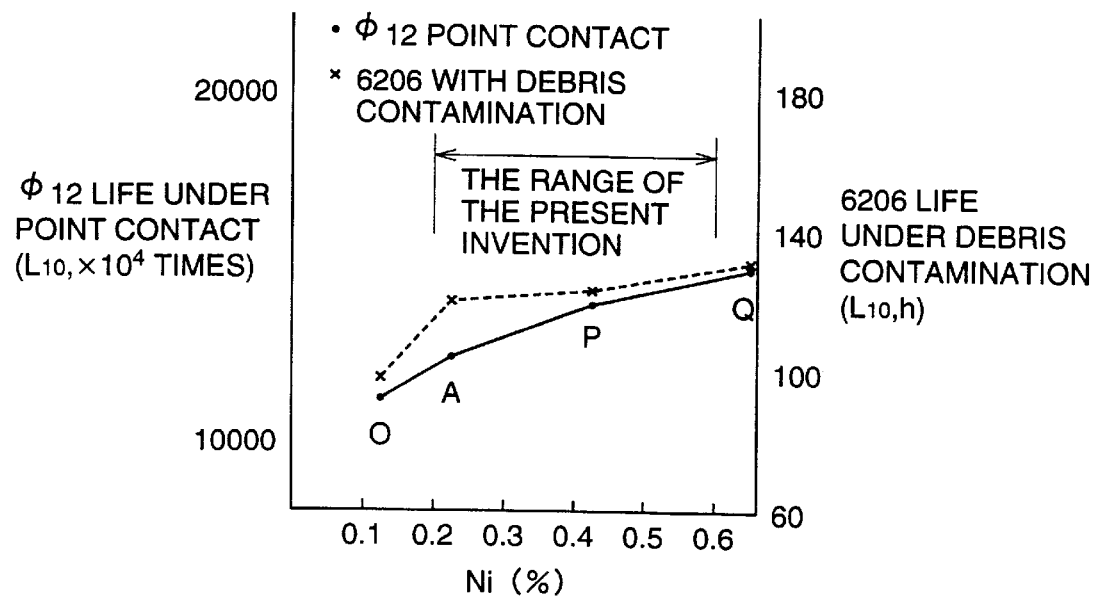
FIG. 5 is a graph showing the relation between the Ni content and the rolling contact life.
Figure 6:
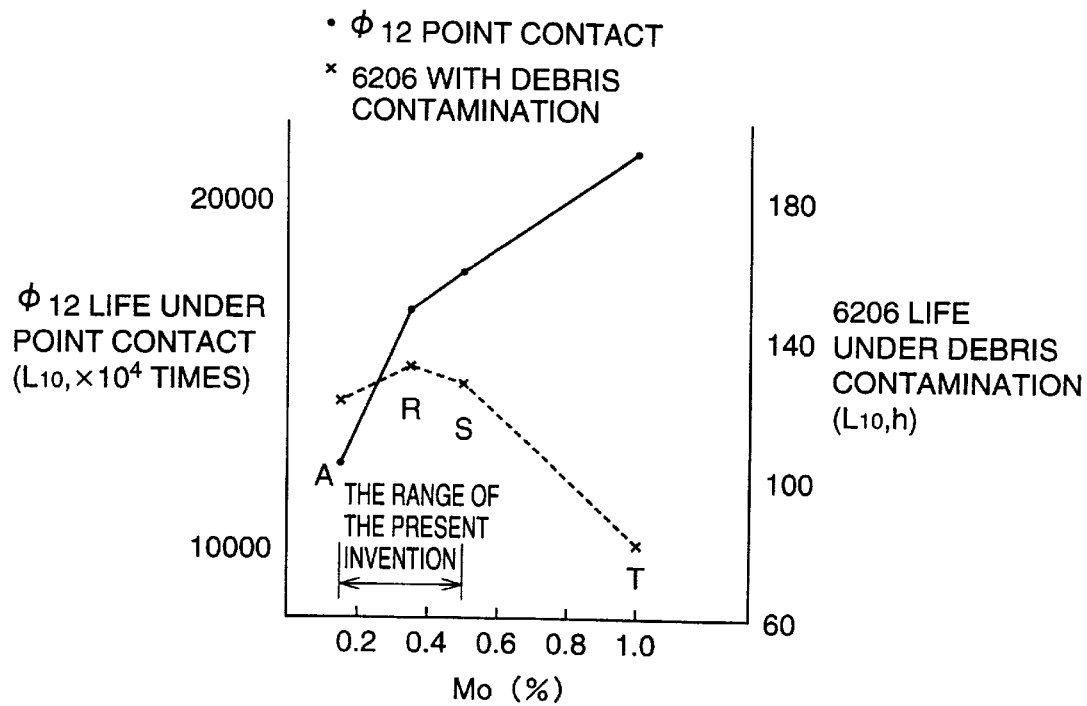
FIG. 6 is a graph showing the relation between the Mo content and the rolling contact life.

The result of the above described test is shown in Table 4. The effects of each of chemical components (C, Si, Mn, Cr, Ni and Mo) on the life of the bearing are shown in FIGS. 1–6, respectively.

TABLE 4

Test Results of Carburized Steel

| Steel type | Life at high contact stress $L_{10}(\times 10^4)$ | Life ratio | Life under debris contamination $L_{10}(h)$ | Life ratio | |
|---|---|---|---|---|---|
| A | 12200 | 1.7 | 121 | 1.7 | Effect of |
| B | 13100 | 1.8 | 118 | 1.7 | |
| C | 11400 | 1.6 | 137 | 2.0 | |
| D | 9820 | 1.3 | 101 | 1.4 | Effect of Si |
| E | 13400 | 1.9 | 131 | 1.9 | |
| F | 14300 | 2.0 | 133 | 1.9 | |
| G | 8500 | 1.2 | 98 | 1.4 | Effect of Mn |
| H | 8900 | 1.2 | 110 | 1.6 | |
| I | 17100 | 2.4 | 140 | 2.0 | |
| J | 9700 | 1.4 | 87 | 1.2 | Effect of Cr |
| K | 12300 | 1.7 | 116 | 1.7 | |
| L | 12700 | 1.8 | 125 | 1.8 | |
| M | 17800 | 2.5 | 121 | 1.7 | |
| N | 20100 | 2.8 | 87 | 1.2 | |
| O | 11000 | 1.5 | 98 | 1.4 | Effect of Ni |
| P | 13900 | 1.9 | 121 | 1.7 | |
| Q | 14700 | 2.0 | 130 | 1.9 | |
| R | 16700 | 2.3 | 130 | 1.9 | Effect of Mo |
| S | 17800 | 2.5 | 125 | 1.8 | |
| T | 20900 | 2.9 | 80 | 1.5 | |
| U | 23000 | 3.2 | 168 | 2.4 | Optimal combination |
| V | 7200 | 1.0 | 70 | 1.0 | SCr420 |

In FIGS. 1–6, the symbol "·" represents a 10% life of the φ12 point contact (high contact stress) test sample and symbol "x" represents a life of the roll bearing 6206 having debris contamination.

From the results shown in FIGS. 1–6, it was found that Si and Mn are the elements which enhance both the life of the φ12 point contact (high contact stress) test sample and the life of the ball bearing 6206 having debris contamination (hereinafter referred to as 6206 life under debris contamination). In addition, it was found that though addition of Cr and Mo in a larger amount enhances the φ12 life under point contact (high contact stress), it had a negative effect on the 6206 life under debris contamination. A large amount of carbo-nitride produced by carbo-nitriding forms a composite with Cr and Mo and becomes larger, which acts as a source of stress concentration or as a debris, as the large composite is easily peeled off.

When the Ni content reaches a certain amount (0.2%), its effect on life becomes less evident. The effect of C also is not clear because the amount of C is increased by both carburizing and carbo-nitriding.

The addition of Si suppresses carburizing. Under the conditions of carburizing and carbo-nitriding of the present invention, the depth of carburizing and carbo-nitriding became shallow along with the increase in the Si content. With a Si content of 0.55%, the depth decreased by about 40% compared with a case with a Si content of 0.35%. Therefore it is necessary to keep a relatively low Si content and a relatively high C content in order to enhance the carburizing speed. It was confirmed that by ensuring the content of at least 0.3% of C and at most 0.35% of Si, twice the carburizing speed of a normal SCr 420 could be attained.

The reference values for the φ12 life under point contact (high contact stress) and the 6206 life under debris contamination were set, considering the fluctuation, 1.5 times the carbo-nitrided SCr 420 10% lives which were 7200×104 times and 70 hours, respectively.

Through the tests above, it was found that as a particularly large amount of Mn and suitable amounts of Cr, Ni and Mo are contained, an inexpensive bearing material exhibiting a long life both under large contact stress and debris contamination could be obtained. It was also found that by suitable selection of the C and Si contents, favorable carburizing speed characteristic and rolling life could be attained.

In addition, the relation between the maximum length (maximum grain size) of carbide in the rolling contact surface layer and the 6206 life under debris contamination is shown in FIG. 7 based on the steel samples A–V of Table 1. Referring to FIG. 7, it was found that the maximum size of the carbide which would not cause the decrease in the life under debris contamination was 3.5 μm, from the correlation between the carbide size of carbo-nitrided product and the life under debris contamination.

Further, it was confirmed that if the size of carbide was 8 μm or smaller in the mill scale surface layer of the carbo-nitrided product, the anti-crack strength would not significantly be degraded.

SECOND EXAMPLE

The hardness of the surface layer, the hardness of the core, the residual stress in the surface layer, and the amount of retained austenite in the surface layer and in the core were measured using the steel with optimal composition (U) in the Example 1 at varying tempering temperature. The result is shown in Table 5.

In the column of "residual stress" in Table 5, figures with sign "−" are compressive stress, whereas those with sign "+" represent tensile stress.

TABLE 5

| Steel type | Heat treatment | Tempering Temperature (° C.) | Hardness of Surface Layer (Hv) | Hardness of Core (Hv) | Residual stress (Surface layer 0.1 mm) | Amount of Retained Austenite Surface layer $\gamma_R$ (%) | Amount of Retained Austenite Core $\gamma_R$ (%) |
|---|---|---|---|---|---|---|---|
| U | Carburizing + Carbo-Nitriding | 180 | 780 | 500 | −200 MPa | 29.5 | 2.0 |
| | | 200 | 770 | 490 | −230 | 28.5 | 2.0 |
| | | 230 | 745 | 460 | −250 | 27.0 | 1.5 |
| | | 250 | 700 | 420 | −250 | 22.0 | 0 |

TABLE 5-continued

| Steel type | Heat treatment | Tempering Temperature (° C.) | Hardness of Surface Layer (Hv) | Hardness of Core (Hv) | Residual stress (Surface layer 0.1 mm) | Amount of Retained Austenite Surface layer γ$_R$ (%) | Amount of Retained Austenite Core γ$_R$ (%) |
|---|---|---|---|---|---|---|---|
| SUJ2 | Standard | 180 | 780 | 760 | −50 | 10.5 | 10.5 |
|  |  | 200 | 750 | 740 | −40 | 7.0 | 7.0 |
|  |  | 230 | 690 | 660 | ±0 | 0.5 | 0.5 |
|  |  | 250 | 650 | 650 | +10 | 0 | 0 |

The above results show that along with the tempering temperature rising, the compressive residual stress decreased in the surface layer of steel consisting of SUJ2, while the compressive residual stress increased in the surface layer of steel U having the composition within the range of the present invention. In addition, in the steel U having the composition within the range of the present invention, the amount of retained austenite in the core suddenly dropped when the tempering temperature exceeded 230° C. and the amount became zero at a tempering temperature of 250° C., while the amount of retained austenite in the surface layer was 20% or more. This is because the carbo-nitriding is particularly effective on the steel containing large amounts of Cr, Si and Mn, and provides tempering resistance (little change in hardness) and structural stability.

Though the retained austenite in the core has no effect on the rolling contact life, a smaller amount is preferred because it causes a dimensional deterioration over a long period of time. In the surface layer, at least 20% retained austenite must exist in order to enhance the rolling contact life.

By tempering the steel U having the composition within the range of the present invention at 230° C. or a higher temperature, compressive stress in the surface layer can be increased and 20% retained austenite in the surface layer can be secured. Thus a surface layer material with a long rolling contact life can be obtained. This material additionally comes to have a favorable dimensional stability, as the amount of austenite decreases in the core.

Thus as shown by the foregoing, an inexpensive long life bearing material can be obtained without a special heat treatment by setting suitable limits for the contents of C, Si, Mn, Cr, Ni and Mo. Particularly, the Mn content is increased to provide the increase in and stability of retained austenite as can be attained with the increase in the Ni content, and the amounts of Cr and Mo are adjusted to suppress the coarsening of carbide at carburizing and carbo-nitriding, whereby a sufficient surface layer hardness and tempering resistance are provided and the formation of stress concentration source is avoided. Thus a material having both toughness and hardness can be obtained. These materials show a life triple that of standard bearing steel under the high plane pressure by a normal heat treatment (carburizing), and the life under debris contamination of 2.5 times that of carbo-nitrided standard bearing steel.

In the case of the carbo-nitrided product, the maximum size of carbide which would not be a source of stress concentration is 3.5 μm below the rolling contact surface. Though the anti-crack strength significantly decreases along with the coarsening of carbide, it has already been confirmed that the anti-crack strength would not show a significant decline if the carbide size in the mill scale surface layer is maintained at 8 μm or smaller.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rolling bearing comprising a rolling bearing ring having a mill scale surface and a rolling element, said rolling bearing ring and said rolling element each having a surface portion and a core portion, said rolling element in contact with said rolling bearing ring, wherein the portion of said rolling bearing ring in contact with said rolling element forms a rolling contact surface, wherein at least one of said rolling bearing ring and said rolling element consists of carburized steel consisting essentially of at least 0.3 wt. % and at most 0.6 wt. % of C, at least 0.1 wt. % and at most 0.35 wt. % of Si, at least 1.1 wt. % and at most 1.5 wt. % of Mn, at least 0.5 wt. % and at most 2.0 wt. % of Cr, at least 0.2 wt. % and at most 0.6 wt. % of Ni, and at least 0.15 wt. % and at most 0.5 wt. % Mo, and wherein said carburized steel has a distribution of carbide having a maximum size of at most 3.5 μm below said rolling contact surface and having a maximum size of at most 8 μm below said mill scale surface and wherein said carburized steel includes at least 20% and at the most 30% of retained austenite in said surface portion and at most 5% of retained austenite in said core portion.

2. The rolling bearing according to claim 1, wherein said carburized steel has a surface layer with a compressive stress equal to or less than -150MPa.

* * * * *